(12) United States Patent
Gagne et al.

(10) Patent No.: US 8,708,689 B2
(45) Date of Patent: Apr. 29, 2014

(54) CO-MOLDING DISPLAY WITH BODY OF MOBILE DEVICE

(75) Inventors: Jacques Gagne, Los Gatos, CA (US); Gerald Kirk McGinty, Santa Cruz, CA (US)

(73) Assignee: Facebook, Inc., Menlo Park, CA (US)

( * ) Notice: Subject to any disclaimer, the term of this patent is extended or adjusted under 35 U.S.C. 154(b) by 164 days.

(21) Appl. No.: 13/229,658

(22) Filed: Sep. 9, 2011

(65) Prior Publication Data

US 2013/0065645 A1    Mar. 14, 2013

(51) Int. Cl.
*B29C 45/44* (2006.01)

(52) U.S. Cl.
USPC ..... 425/468; 425/577; 425/438; 425/DIG. 10

(58) Field of Classification Search
CPC .......................... B29C 45/44; B29C 45/4435
USPC .......................... 425/577, 438, 468, DIG. 10
See application file for complete search history.

(56) References Cited

U.S. PATENT DOCUMENTS

| | | | | |
|---|---|---|---|---|
| 4,352,772 A | * | 10/1982 | Bezner | 264/229 |
| 5,037,290 A | * | 8/1991 | Curliss et al. | 425/556 |
| 8,147,238 B1 | * | 4/2012 | Zou et al. | 425/577 |

* cited by examiner

*Primary Examiner* — Joseph S Del Sole
*Assistant Examiner* — Lawrence D Hohenbrink, Jr.
(74) *Attorney, Agent, or Firm* — Fenwick & West LLP

(57) ABSTRACT

Tooling and methods for co-molding a body with two different materials. An internal die assembly comprising at least two parts allows for placement of a component and co-molding of the body around the component and then removal of the internal die assembly without disturbing the body.

4 Claims, 14 Drawing Sheets

CO-MOLDING DISPLAY WITH BODY OF MOBILE DEVICE

BACKGROUND

The application relates to methods and tooling for making bodies for mobile devices and the resulting body for a mobile device.

Bodies for mobile devices usually include multiple materials. For example, glass or other transparent material is often used for the display while the majority of the remainder of the body is often molded plastic or another molded material. The molding can be accomplished by injection molding. Traditionally, the display portion of the device is assembled to the rest of the molded body during the assembly process. The later addition of the display portion and other components to the molded portion of the body requires gaskets and the like to mate the display portion to the other components. In addition to being aesthetically unappealing, the gaskets and having multiple seams where the various materials meet the gasket may undesirably capture dust and dirt, which, over time, works to loosen the seal between the various portions of the body. Moisture has more entry routes into the device, leading to corrosion of internal components. Each of the multiple seams are also a weak portion in the body where the body is most likely to break when dropped.

SUMMARY

Tooling and methods for co-molding a body of a device that comprises more than one material are described. The tooling comprises an external die assembly and an internal die assembly for forming an exterior and an interior of the body of the device. The internal die assembly is further configured for placement of a component of the device that is exposed to the exterior, such as a display screen. The apparatus holds the body component of the first material in place while the remainder of the body is applied around that component.

The internal die assembly comprises a top and a bottom internal die. The bottom internal die comprises a top side and a bottom side opposite the top side, wherein the top side is sloped at an angle relative to the bottom side and wherein the top side comprises a notch. The top internal die comprises a top side comprising an depression having a shape of a component of the body, the depression having a depth. The top internal die further comprises a bottom side opposite the top side, wherein the second bottom side is sloped at the same angle relative to the second top side as the top side relative to the bottom side of the bottom internal die. The second bottom side also comprises a notch.

In a method for forming the body of the device, a first component of the body is placed in the depression on the top internal die. In one embodiment, this first component is a piece of glass or acrylic used for a display of the device. The device's body is then molded around the first component, e.g., by injection molding. In one embodiment, the body of the device is formed from a material that is different from the first material, such as a plastic. The finished body with first component is open on all but one side and the open side is a narrow opening.

After forming the body with first component, the internal die assembly is removed by first withdrawing the bottom internal die through the narrow opening. As the bottom internal die is withdrawn, the top internal die drops at least the distance of the depth of the depression so that the top internal die clears the first component that had been placed in the depression and the top internal die can be withdrawn from the finished body.

The finished body comprises at least two materials, the first component and the molded body of the device. Since the first component has been co-molded with the body, the two materials are in direct contact with each other resulting in a better integration of the two materials into a single body. In one embodiment, the finished body with first component comprises a housing for a mobile device, wherein the first component is a display for the mobile device. The display may be glass and the body a plastic, where the glass display and the plastic body are co-molded.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Disclosed is a method for fabricating a body for a mobile device, including the display portion, by injection molding the non-display portion around the display. The formed body is substantially closed on all but the bottom narrow opening of the body and operates like a sleeve or glove into which the internal components of the mobile device are inserted. The tooling for molding the body comprises external and internal die assemblies. The internal die assembly comprises two pieces that together allow for correct placement of the display portion of the body and then formation of the interior of the mobile body. The internal die assembly is then removed from the formed body without disturbing the formed body.

Figure 1:
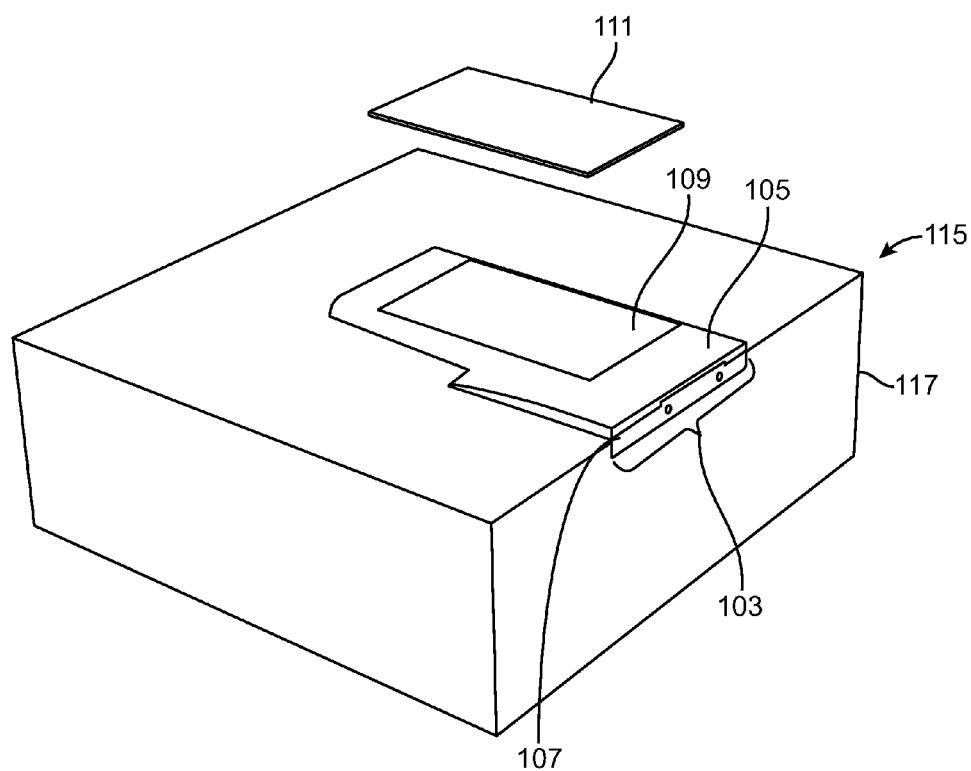
FIG. 1 illustrates an apparatus for molding a body of a mobile device according to one embodiment.

Forming the mobile body is described in greater detail with reference to FIG. 1. The internal die assembly 103 comprises a top internal die 105 and a bottom internal die 107. The materials for internal die assembly 103 are any materials suitable for use with injection molding. Examples include, but are not limited to, steel, a beryllium-copper alloy, and aluminum. The top internal die has a depression 109 in which the display 111 fits. The display 111 can be any display used for mobile devices. They are typically glass, polycarbonate or acrylic. Glass provides a preferred user experience with the finished device. Mobile devices often have touch screens and thus the display 111 is then a part of the touch screen.

The depression 109 holds the display 111 while the body is molded around the display 111. The depression 109 can be any size needed and will depend on the size of the display 111 needed for the mobile device. The depression 109 holds the display 111 well enough that the display 111 ends up correctly placed in the finished body but loosely enough that the top internal die 105 can be removed from the finished body without disturbing the finished body. The bottom internal die 107 ensures that the finished molded body with display 111, has the correct size and shape to fit the inner workings of the mobile device. The internal die assembly 103 is used with a external die assembly 115 that comprises a top external die 119 and a bottom external die 117. The materials for making external die assembly 115 are materials suitable for use with injection molding. Examples include, but are not limited to, steel, a beryllium-copper alloy, and aluminum. Details of the mold, such as for example, injection nozzles for the material of the non-display portion of the body, cooling holes, insulating plates, and the like are not shown in the drawings, since they can be made in the convention manner and are not important for understanding the disclosed invention.

Figure 2:
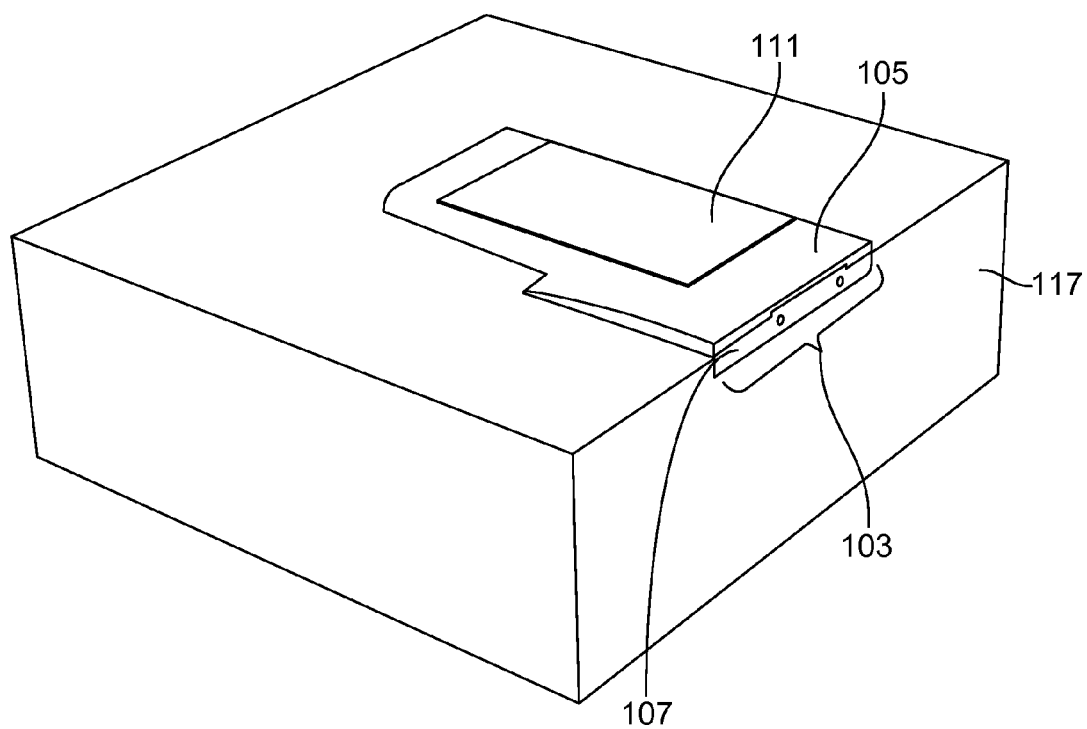
FIG. 2 illustrates placement of a display on an apparatus for molding a body of a mobile device according to one embodiment.

The operation of the internal die assembly 103 is described in reference to FIGS. 2-6. As shown in FIG. 2, the display 111 is placed in the depression 109 on the top internal die 105. The top internal die 105 is in place on top of the bottom internal die 107.

Figure 3:
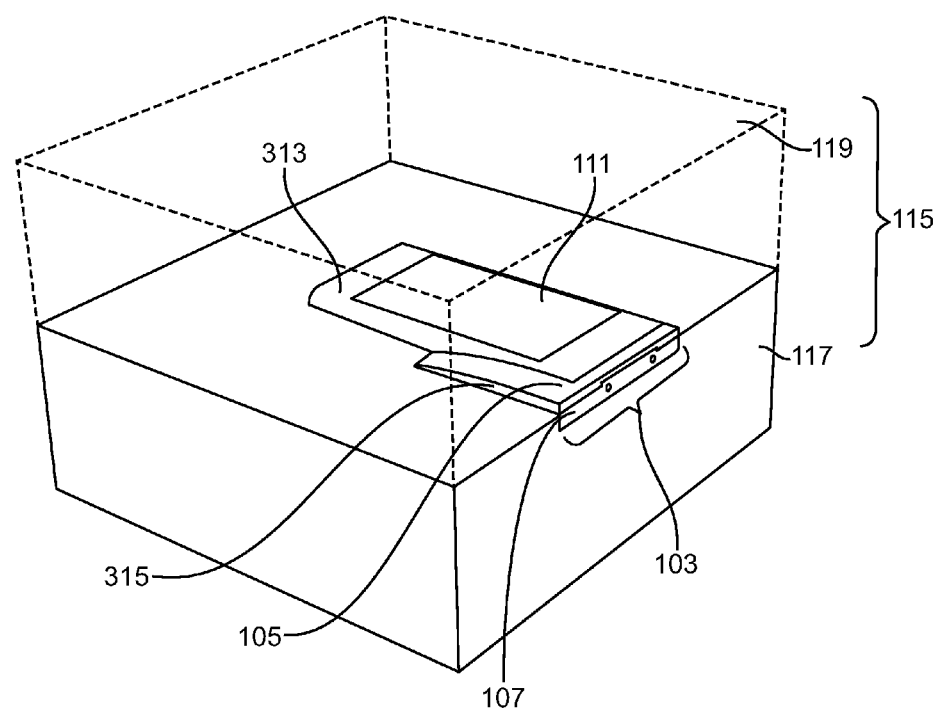
FIG. 3 illustrates the finished body after injection molding the body for a mobile device around the display according to one embodiment.

The remainder of the body is then injected around the internal die assembly 103 and display 111. The body 313 after molding is a sleeve into which the internal components of the device can be inserted. The remainder of the body comprises a second material which can be any material suitable for injection molding. Example materials used for injection molding include, but are not limited to glass-filled nylon, polycarbonate and various grades of polycarbonate-acrylonitrile butadiene styrene. In one embodiment, the body 313 is substantially closed on all but one side after formation. The closed portions optionally include openings for various ports and components such as a camera lens, an earphone jack, buttons and the like. In some embodiments, the top internal die 105 and/or the bottom internal die 107 includes protrusions or shapes result in various grooves or protrusions on the finished body 313. The embodiment shown in FIG. 3 illustrates one such protrusion 315 that results in an open groove in the completed body 313.

Figure 4A:
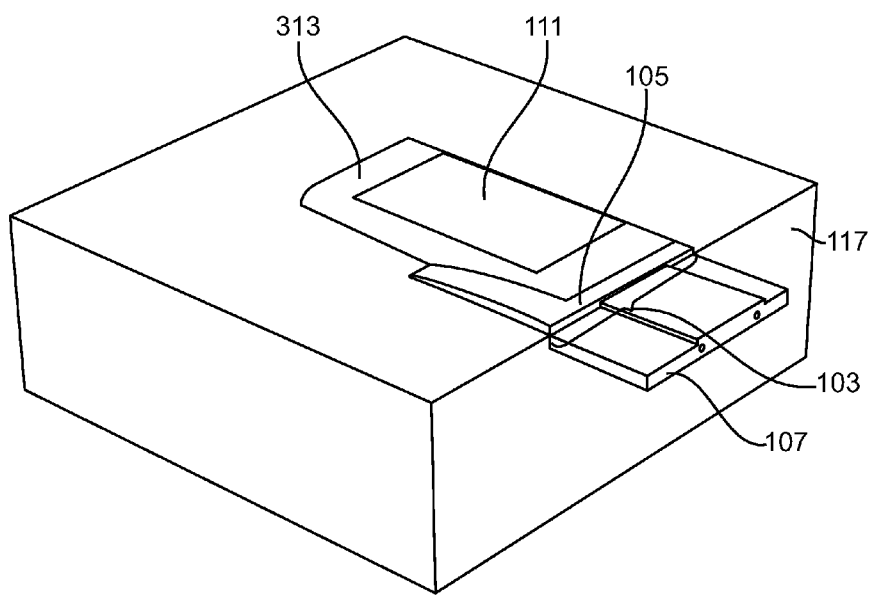
FIGS. 4A-4B illustrate the removal of the apparatus from the completed body according to one embodiment.
Figure 4B:
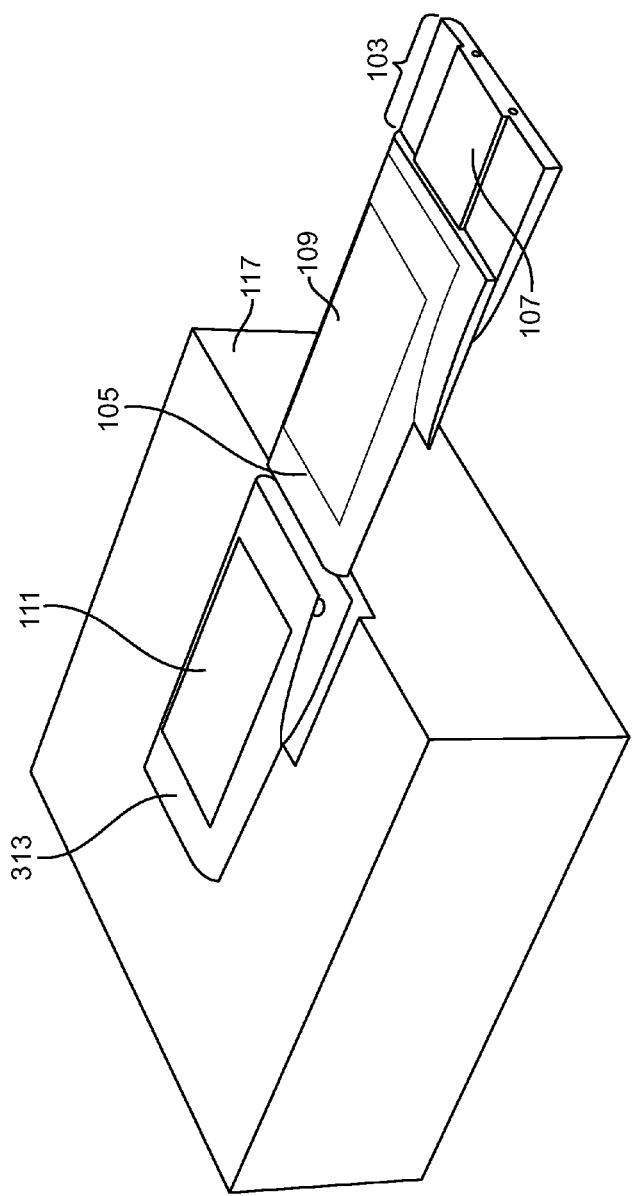

Next, the internal die assembly 103 is removed from inside the body 313. This is made possible by having the internal die assembly comprise at least two parts. The removal is described in reference to FIGS. 4-5. FIGS. 4A-4B shows the general procedure. The bottom internal die 107 is slid out of the body 313. The removal of the bottom internal die 107 allows the top internal die 105 to drop free from the display 111. As shown in FIG. 4B, the top internal die 105 is then removed without disturbing the display 111 which is now a part of the body 313.

Figure 5A:
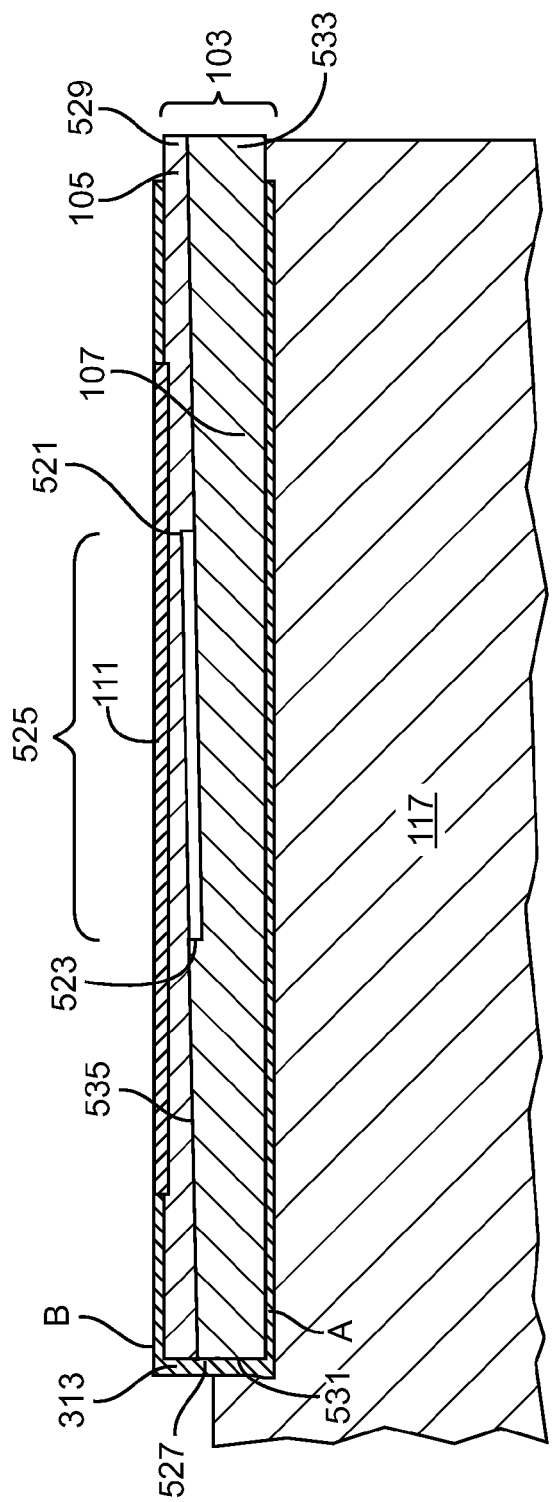
FIGS. 5A-5B illustrate a cross-section view of the removal of the apparatus from the completed body according to one embodiment.
Figure 5B:
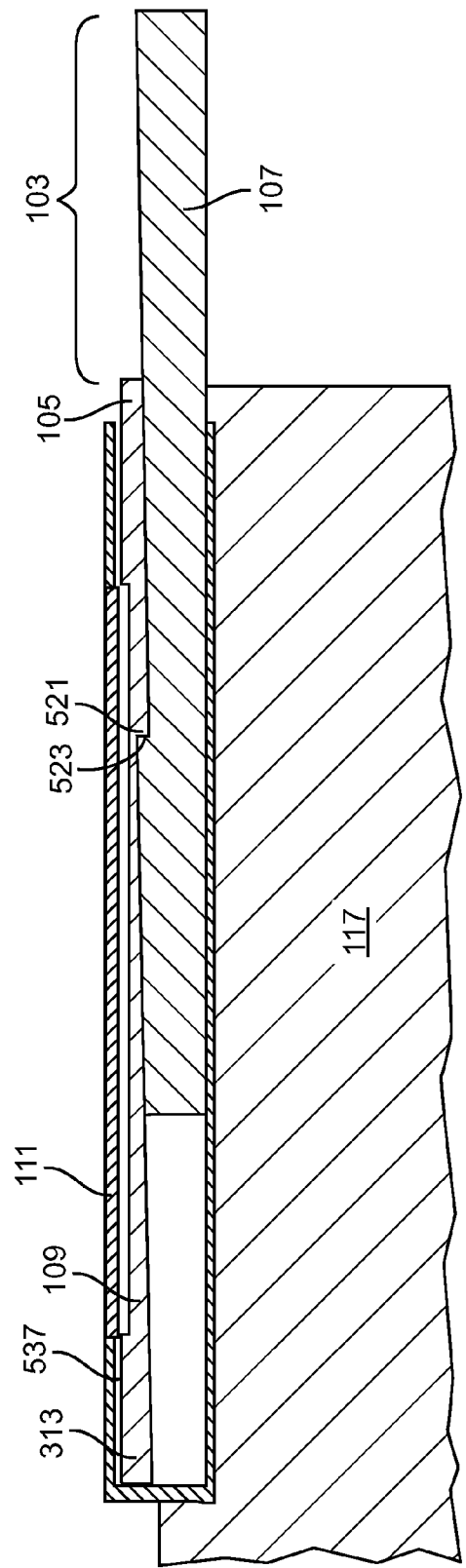

FIG. 5A is a cross-section view of the apparatus in the mold after completion of the body 313. The bottom surface of the top internal die 105 and the top surface of the bottom internal die 107, which meet at interface 535, are angled. When ends 527 and 531 of the top internal die 105 and bottom internal die 107, respectively, are substantially flush with each other, the internal die assembly 103 has the size and shape of the internal cavity of the completed body 313. The top surface of the bottom internal die 107 is angled such that end 531 is shorter than end 533. The bottom surface of the top internal die 105 is angled such that end 529 is shorter than end 527. This configuration allows for top internal die 105 to lower away from display 111 in the body 313 as bottom internal die 107 is slid out of body 313 at the end of body 313 corresponding to ends 529 and 533. Additionally, top internal die 105 has a notch 521 and the bottom internal die 107 has a notch 523. The distance 535 is the distance the bottom internal die 107 can be retracted until notch 523 engages notch 521. FIG. 5B illustrates that when the bottom internal die 107 is retracted sufficiently that notch 523 engages notch 521 top internal die 105 has lowered leaving gap 537. Gap 537 is at least as tall as the depth of depression 109 and thus the top internal die 105 can be retracted without disturbing the display 111. Notch 523 engaging notch 521 results in the top internal die 105 being pulled out of the body 313 along with bottom internal die 107. In one embodiment, the bottom internal die 107 is withdrawn about 40 mm when notch 523 engages notch 521. At this point, gap 537 is about 0.075 mm. The angle of the top surface of the bottom internal die 107 and the bottom surface of the top internal die 105 are determined geometrically based on the position and depth of the depression 109 in the top internal die 105. Any number of different size displays 111 for bodies 313 for mobile devices can be accommodated by adapting the sizes of the top internal die 105 and bottom internal die 107 as well as the angles of the bottom surface of the top internal die 105 and the top surface of the bottom internal die 107.

Figure 6A:
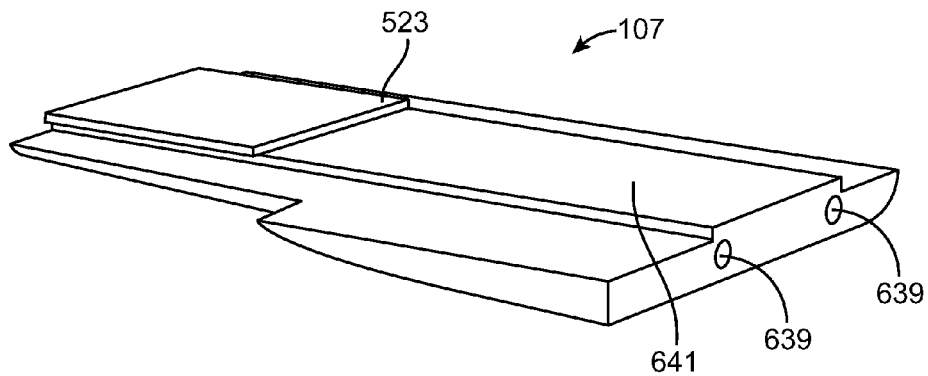
FIGS. 6A-6B illustrate the bottom internal die of the apparatus according to one embodiment.
Figure 6B:
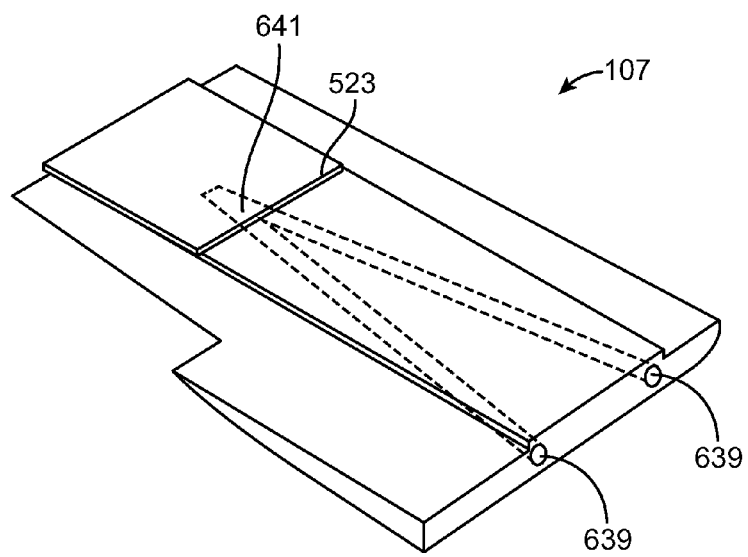

FIGS. 6A-6B illustrate the bottom internal die 107 according to one embodiment. The bottom internal die 107 includes a channel 641 with openings 639 through which coolant is guided. This allows for more rapid cooling of the body 313 after molding has been injected. In one embodiment, the channel 641 has diameter of about 4 mm. The diameter can be any diameter that fits inside the bottom internal die 107. The channel need not have a uniform diameter. FIG. 6A illustrates the cooling channel 641 with a side cross-section. The hatching illustrates the solid portion of the side cross-section. FIG. 6B illustrates a top cross-section. In FIG. 6B the channel 641 is shown as having a V shape from opening 639 to opening 639. Alternatively, the channel 641 can have any other shape. For example, a U shape would result in a larger surface area of the channel 641 inside the bottom internal die 107. An M or spiral shape would result in an even larger surface area. Depending on the material being used for injection molding the body 313, more rapid cooling (facilitated by greater surface area of the channel 641) is beneficial.

Figure 7:
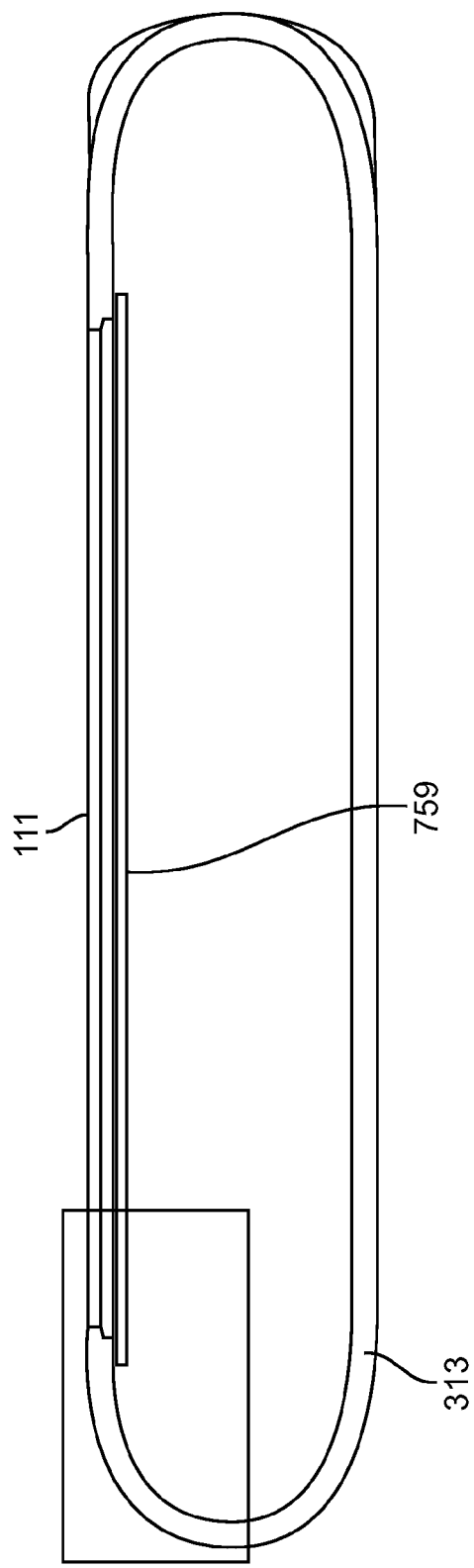
FIG. 7 is a cross section of the device illustrating installation of additional layers for a touch screen according to one embodiment.
Figure 8:
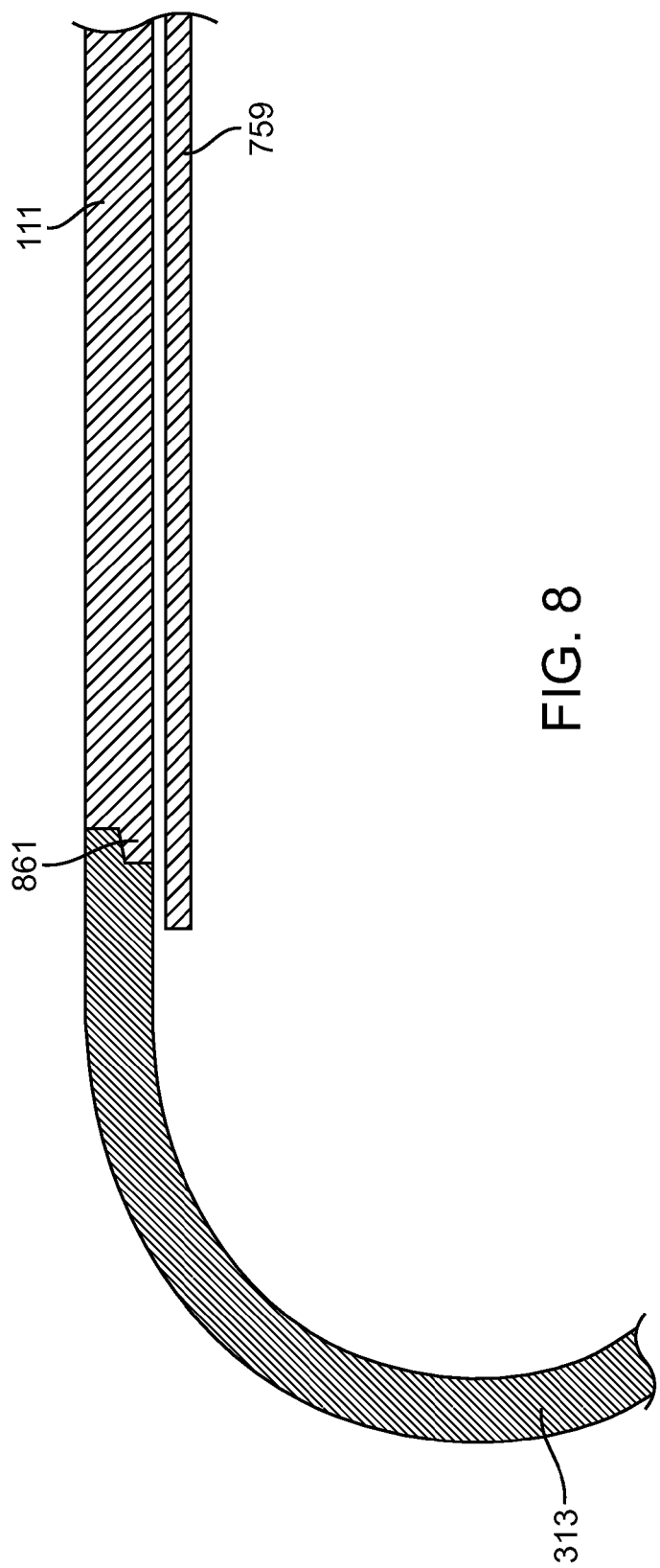
FIG. 8 is a more detailed view of embodiment portion of FIG. 7.

In one embodiment, the display 111 is the outer layer of a touch screen. The remaining layers of the touch screen are installed after formation of the body 313. Certain materials used in some touch screens, such as indium tin oxide (ITO), may be incompatible the molding process and thus cannot be included when the body is molded around the display 111. Because the body 313 is substantially enclosed on all but the side corresponding to internal die assembly 103 ends 529 and 533, touch screen components 759 are installed by use of remotely operated devices such as a robotic arm. FIG. 7 illustrates a cross-section of body 313 after insertion of the additional touch screen components 759. FIG. 8 illustrates a zoomed in view of the cross-section of body 313 after insertion of the touch screen components 759. There is a distance of 0.20 mm between the display 111 and the touch screen components 759. In that distance is a bonding material. Any suitable bonding materials for bonding components of a touch screen together may be used. The touch screen components 759 are 0.40 mm thick. In this embodiment, the display 111 has a notch 861 which extends 0.50 mm from the top edge of the display 111. The touch screen components 759 layer extends an additional 1.00 mm beyond the edge of notch 861. Other configurations are possible depending on the type of touch screen, size of display 111 and proportion of display 111 to the remainder of the body 313.

The described method using the internal die assembly 103 for forming the internal shape of the body 313 has the advantage of avoiding fusible core injection molding which requires forming a core which is melted out of the finished body when completed. The heating of the body to remove the core limits the types of materials that can be used for the body. Internal die assembly 103 can easily be reused for the formation additional bodies 313.

Figure 9:
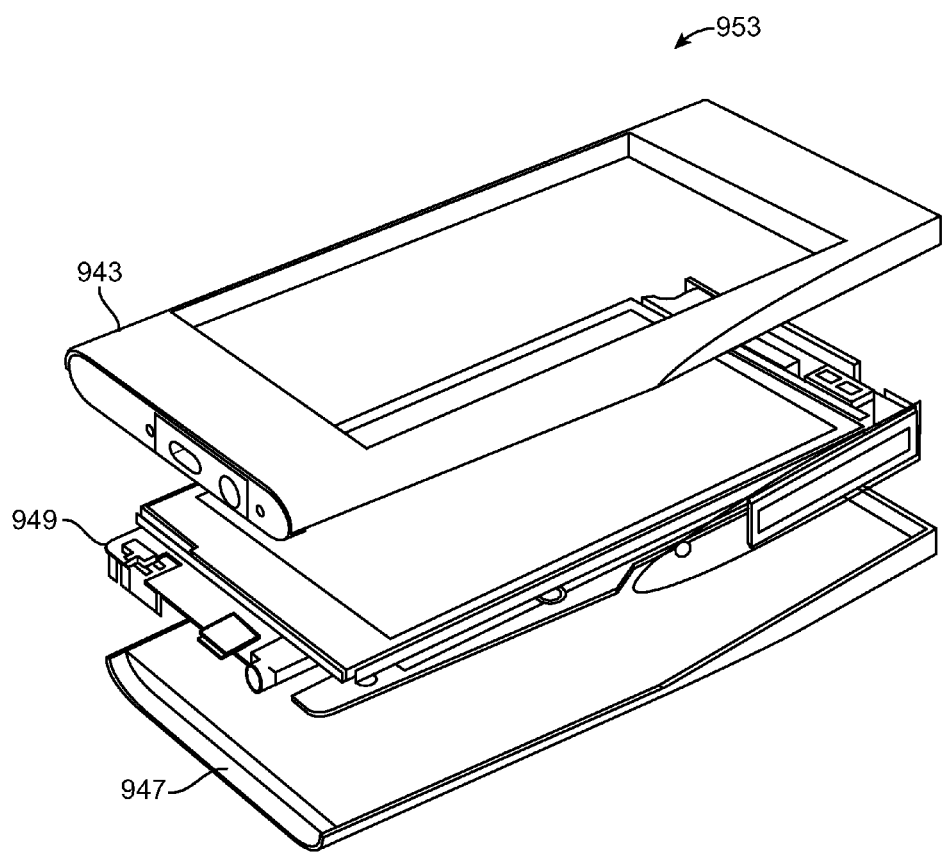
FIGS. 9-12 illustrate the assembly of a mobile device according to one embodiment.
Figure 10:
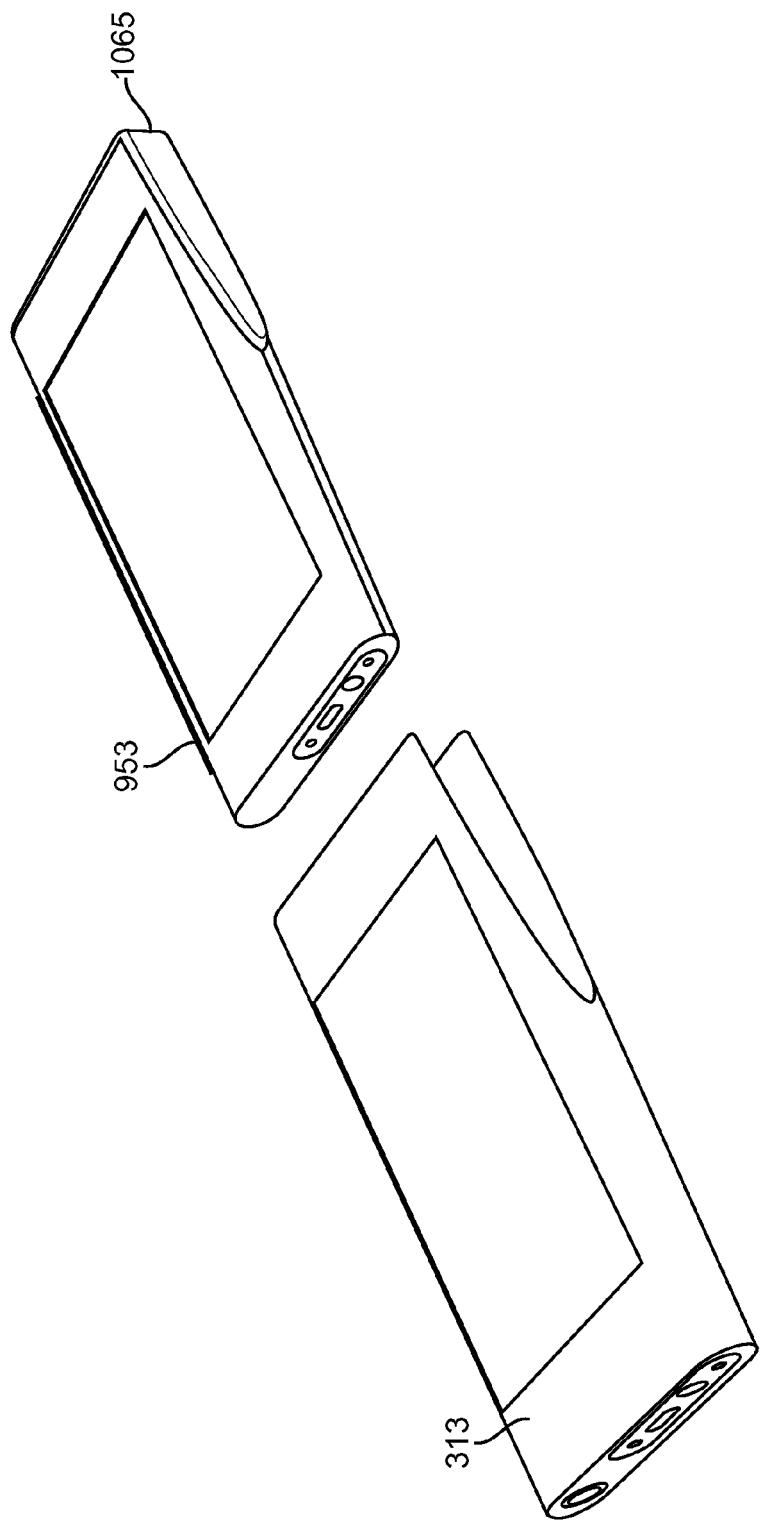
Figure 11:
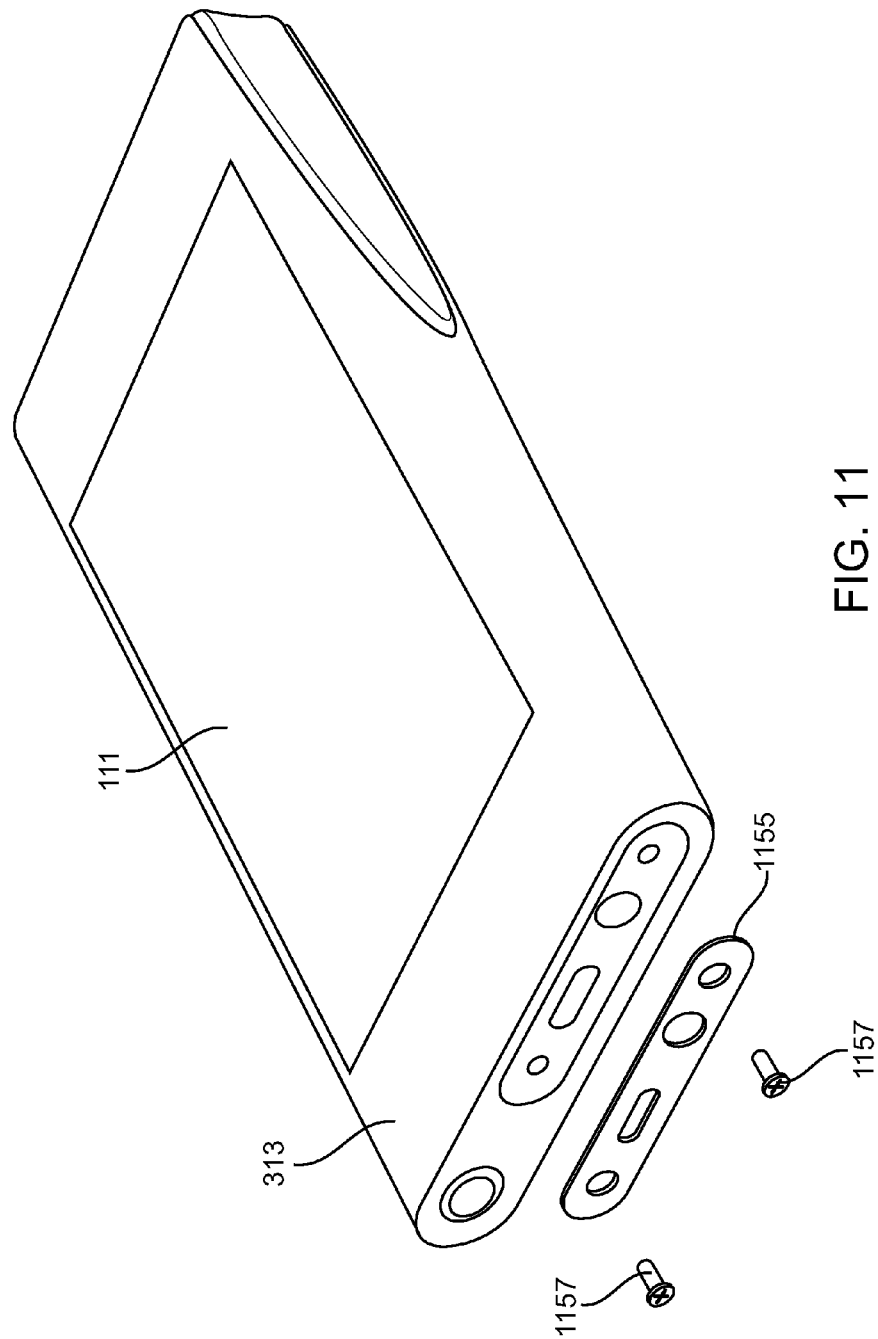

FIGS. 9-11 illustrate the assembly of a mobile device using a body 313. FIG. 9 illustrates assembly of the internal body 953 of the mobile device to be inserted into the body 313. The internal components 949 are placed in the bottom portion 947 of the internal body 953. The makeup of the internal components 949 differ depending on the type of mobile device. The internal components include electronics that provide the operation intended for the mobile device, for example for a telephone, personal digital assistant and the like. The top portion 943 is placed on top of bottom portion 947. The top portion 943 and bottom portion 947 snap together to stay closed. Additionally or alternatively, the top portion 943 and bottom portion 947 are glued together.

FIG. 10 illustrates the internal body 953 inserting into body 313. Internal body 953 had added to it an additional cosmetic piece 1065 that fits into the groove created by protrusion 315. FIG. 11 illustrates the internal body 953 inserted into the body 313 and final attachment using plate 1155 and screws 1157.

Figure 12:
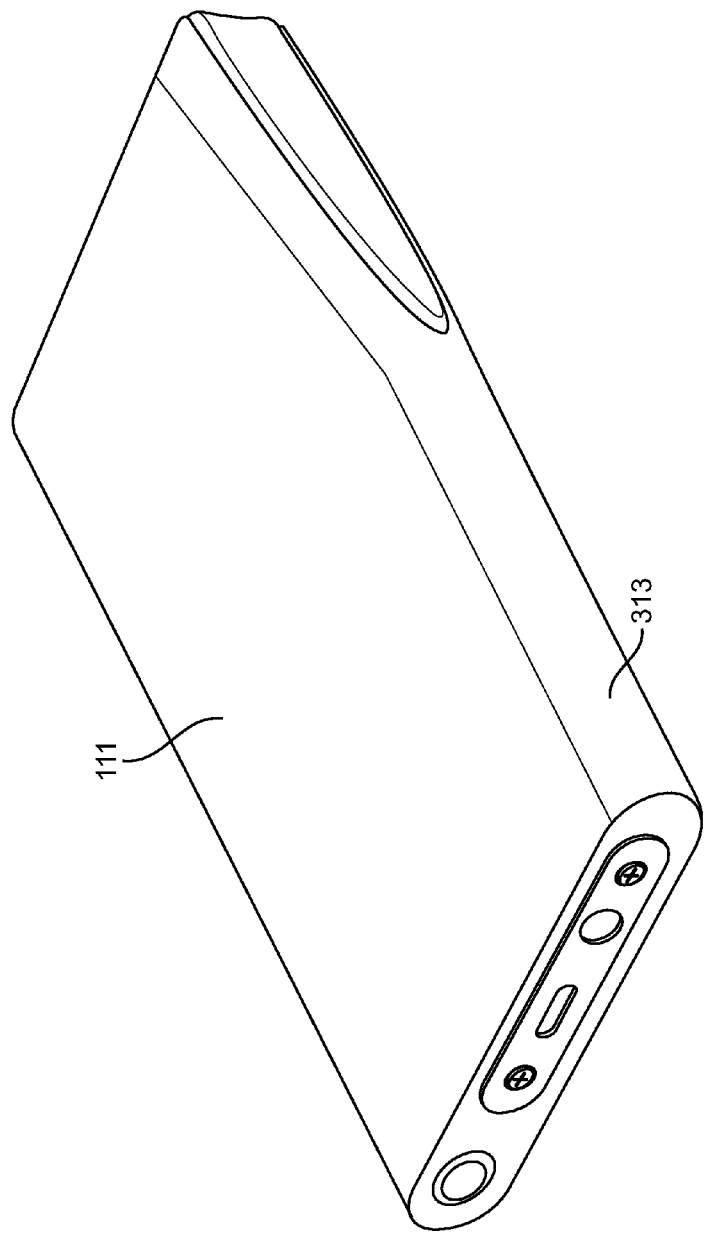

FIG. 12 illustrates a body 313 formed according to the methods and using the internal die assembly 103 described herein according to a second embodiment. The display 111 in this body 313 extends to the ends of the body 313 rather than the body forming a frame around the display 111 in the same plane as the display 111 as in the prior examples.

Embodiments of the invention have been described herein in the context of displays for bodies for mobile devices. However, it will be appreciated that certain of the techniques and devices described may be used to achieve the same benefits in the manufacture of other devices that incorporate different materials in the housing for the device. Additionally, the same techniques can be used to incorporate other materials into the body for a mobile device, such as the microphone and speaker components of the telephone functionality of the mobile device and lens and flash components of the camera functionality of the mobile device. Although the dimensions of the apparatus have been chosen in order to provide optimal use for displays for mobile devices, the fundamental apparatus design can be modified to be used for other devices and other components on mobile devices.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. An apparatus comprising:
    a bottom external die plate shaped to form a portion of an exterior of a body of a mobile device;
    a top external die plate shaped to form another portion of the exterior of the body of a mobile device;
    a bottom internal die comprising a top side and a bottom side opposite the top side, wherein the top side is sloped at an angle relative to the bottom side and wherein the top side comprises a notch;
    a top internal die comprising:
    a top side comprising an indentation having a shape of a display of the mobile device, the indentation having a depth at least as deep as a thickness of the display and configured to hold the display during molding, and
    a bottom side opposite the top side, wherein the bottom side is sloped at the angle relative to the top side and wherein the bottom side comprises a notch;
    wherein the top internal die and the bottom internal die come together at an interface between the top side of the bottom internal die and the bottom side of the top internal die, wherein the notch of the bottom internal die and the notch of the top internal die are separated by a first distance; and
    wherein the angle and the first distance are selected so that when the bottom internal die is withdrawn from the body, the top internal die moves a second distance equal or greater than the depth when the notch of the bottom internal die engages the notch of the top internal die.

2. The apparatus of claim 1 wherein the bottom internal die comprises a channel having a first and a second opening on a first side perpendicular to the bottom side of the bottom internal die.

3. An apparatus for molding a body for a mobile device comprising:
    a bottom component comprising a top side and a bottom side opposite the top side wherein the top side is sloped at an angle relative to the bottom side and wherein the top side comprises a notch;
    a top component comprising:
    a second top side comprising an indentation having a shape of a display of the body, the indentation having a depth at least as deep as a thickness of the display and configured to hold the display during molding, and
    a second bottom side opposite the second top side wherein the second bottom side is sloped at the angle relative to the second top side and wherein the second bottom side comprises a second notch;
    wherein the top internal and bottom internal components come together at an interface between the top side and the second bottom side wherein there is a first distance between the notch and the second notch; and
    wherein the angle and the first distance are such that when the bottom internal component is withdrawn from the body after molding, the top internal component drops a second distance equal or greater than the depth when the notch engages the second notch.

4. The apparatus of claim 3 wherein the first component comprises a channel having a first and a second opening on a first side perpendicular to the bottom side.

* * * * *